(Model.)
2 Sheets—Sheet 2.
R. YORK.
BRANDING CHUTE.
No. 252,345.
Patented Jan. 17, 1882.
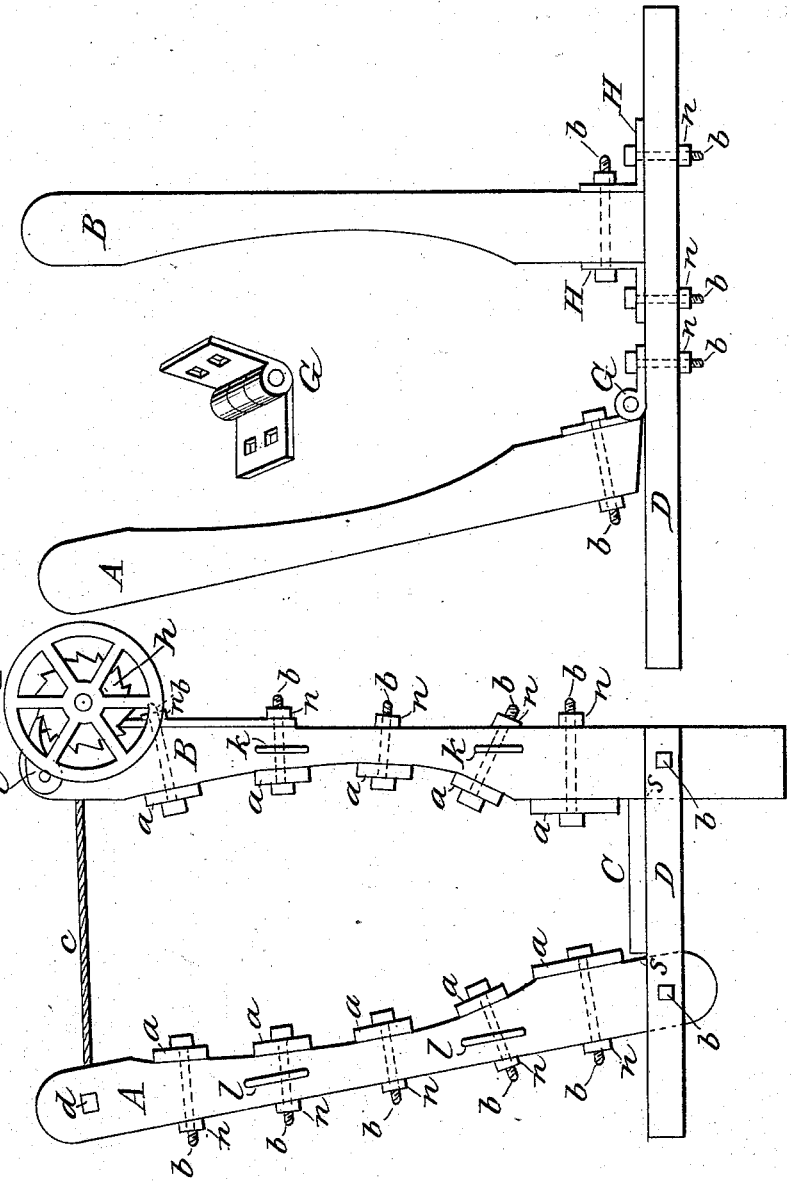
Witnesses:
Inventor.

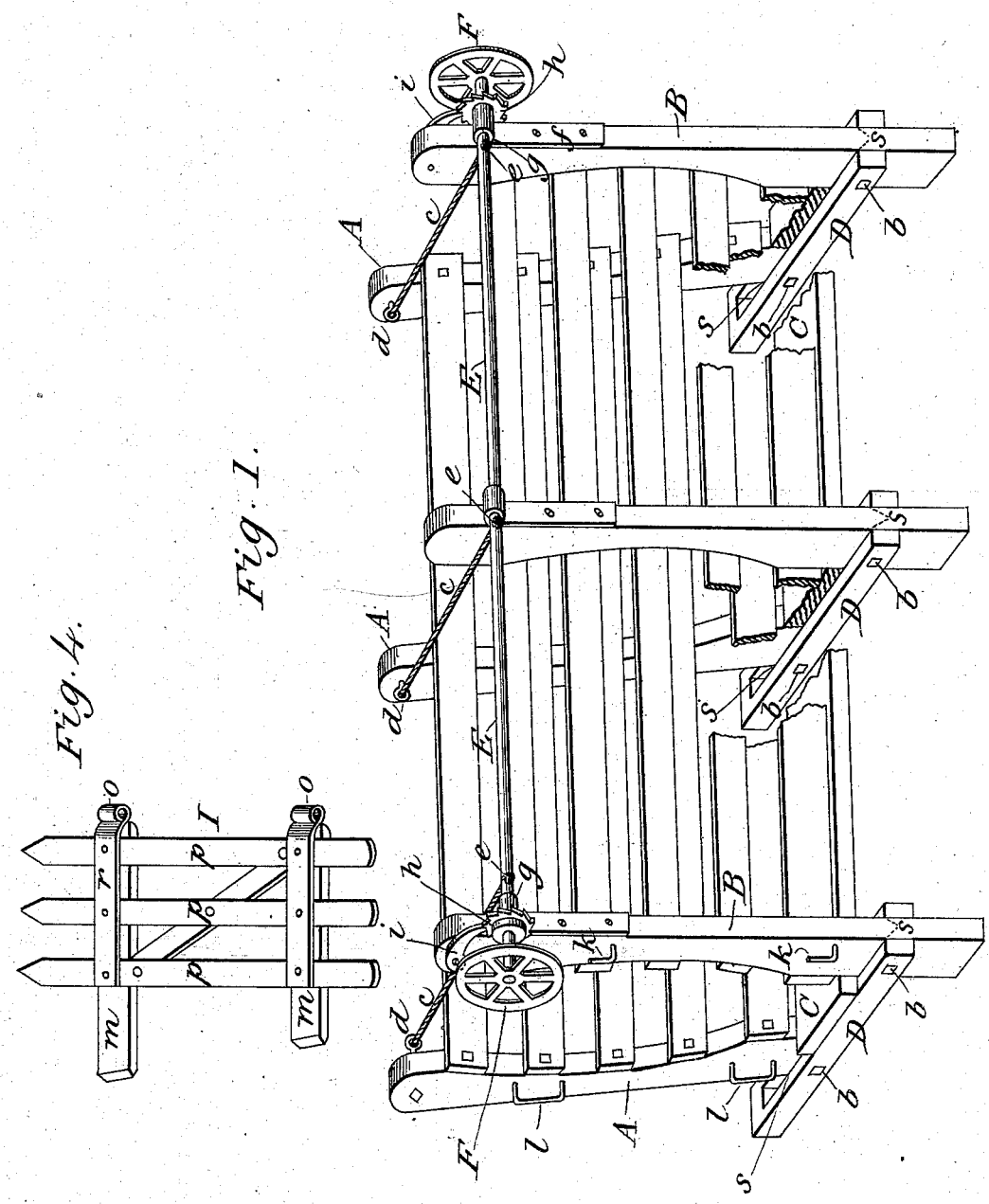

UNITED STATES PATENT OFFICE.

RILEY YORK, OF NORTH PLATTE, NEBRASKA.

BRANDING-CHUTE.

SPECIFICATION forming part of Letters Patent No. 252,345, dated January 17, 1882.

Application filed March 1, 1881. (Model.)

*To all whom it may concern:*

Be it known that I, RILEY YORK, a citizen of the United States, residing at North Platte, in the county of Lincoln and State of Nebraska, have invented a new and useful Branding-Chute, of which the following is a specification.

My invention relates to improvements in branding-chutes; and the object of my improvement is to provide an adjustable branding-chute by means of which animals may be securely held in the chute until the branding-iron has been applied, when they can be easily and speedily released and ejected from the same.

Branding-chutes heretofore in use have been constructed by preparing a narrow lane or passage by means of a fence or other object on each side, making the passage-way large enough for animals—such as cattle and horses—to pass through and into the same while the iron was applied, and by this means cattle and horses confined in the chute have been known to leap upon each other and over the chute in many instances.

By my invention the sides of the chute may be drawn so closely together that the animals are held firmly in the chute while the iron is applied. I obtain these objects and results by the mechanism illustrated in the accompanying drawings, in which—

Figure 1 represents the frame of the branding-chute with the machinery attached, without the side rails or bars attached. Fig. 2 represents an end view of the chute, partly in cross-section, showing the exit end of the chute, hinges and staples for the gate, and ends of the side bars or rails. Fig. 3 represents the manner of attaching the posts or standards to the sills or base by means of hinges and flanged irons. Fig. 4 represents the gate at the exit end of chute, so arranged as to be securely barred or bolted when the sides of the chute are drawn together to secure the animals.

Similar letters refer to similar parts throughout the several views.

In Fig. 1, B represents the posts or standards, securely set in the earth, to which the side rails, *a*, are bolted or nailed, thus comprising one side of the chute.

D represents the cross-sills attached to the posts or standards B and A, on which is the floor of the chute, C. Post or standard B is attached to sill by mortise *s* and by bolt *b*. Post or standard A, which forms the other and adjustable side of the chute, passes through mortise *s* in sills D at bottom, and a bolt holds the posts securely, the mortises *s* being made large enough to allow the top of the posts to be moved to and from the opposite side of the chute by means of a rope or cable attached thereto at *d*, and attached to a shaft, E, made of wood or metal, at *e*, by turning said shaft by means of wheel F or any other adequate means, thus coiling the rope or cable around the shaft. Said shaft is attached to posts or standards B by means of the iron *f*, with flanged or turned ends, forming box *g*, through which the shaft E passes and in which it readily turns. When the shaft is turned, the rope coiled, and the adjustable side of the chute closed up, it is securely held by means of ratchet-wheel *h* and pawl *i*. The gate I is hung on hinges *k*, the end bars, *m*, of the gate passing through the large staples *l* when the sides are drawn together, thus securely bolting it. The posts A and B may be made with curved insides, thus closing around the animals when drawn together, and fitting more perfectly the animals which may be in the chute, and may also, at pleasure, be attached to the sills by means of hinge G and flanged irons H.

In Fig. 2, A represents the adjustable or movable standard or post with curved inside, and ends of the bars or rails *a*, and *b* the bolts with screw and nut, by which the rails are secured to the posts; *s*, the mortise in the sills for the reception of the bottom end of post or standard A, secured by a bolt, *b*, so that the top of the post may be moved to and from the post on the opposite side of the chute. C represents the end of the plank or floor, and D side view of the sill; *c*, the cable, and F the wheel attached to end of shaft; *i*, the pawl; *h*, the ratchet-wheel; B, the stationary posts or standards set in the earth, and secured to sills D by bolt *b*, and exhibiting also the ends of the rails or bars attached thereto, as hereinbefore explained. By turning the wheel F, attached to the shaft E, the cable or rope *c* is coiled around the same, and being fastened to the post or standard A at *d*, said post, or the upper end of the same, is drawn toward the post B, thus closing upon the animals and securing them from floundering or leaping about in the chute. This view represents the exit end of the chute when gate I is hung at $k$; and when post A is drawn up the bars $m$ of gate I pass into the staples $l\ l$ and securely fasten the gate.

Fig. 3 represents the manner in which the posts may be attached to the sills by means of hinges and flanged irons G and H.

In Fig. 4, $o$ is the socket or hinge of the iron bar $r$, which is bolted or nailed to the bars of the gate; $m\ m$, the ends of the bars of the gate, the lower being constructed shorter than the upper, so that they may be each inserted into the staples $l\ l$ at the same time as the adjustable side is drawn upon the stationary side of the chute. $p\ p$ are the palings of the gate.

What I claim as my invention, and upon which I desire to secure Letters Patent, is—

1. In a branding-chute, the bars $a$, fixed posts B, and adjustable posts A, in combination with means for adjusting the sides of the chute toward each other.

2. In a branding-chute, the combination of fixed posts B with the adjustable posts A, floor C, sills D, having mortise $s$, gate I, shaft E, cable $c$, wheel F, pawl $i$, and ratchet $h$, substantially as shown and described.

3. In a branding-chute, the combination of the gate I, having projecting bars $m$, of different lengths, with fixed posts B, adjustable posts A, and bars $a$, substantially as shown.

RILEY YORK.

Witnesses:
J. W. BIXLER,
W. H. BIRGE.